(12) United States Patent
Ronner

(10) Patent No.: US 7,241,225 B2
(45) Date of Patent: Jul. 10, 2007

(54) TORSIONAL VIBRATION INSULATOR

(75) Inventor: Gerhard Ronner, Hebrontshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/397,806

(22) Filed: Apr. 5, 2006

(65) Prior Publication Data

US 2006/0189394 A1     Aug. 24, 2006

Related U.S. Application Data

(63) Continuation of application No. PCT/EP2004/010598, filed on Sep. 21, 2004.

(30) Foreign Application Priority Data

Oct. 6, 2003   (DE) ............................... 103 46 251

(51) Int. Cl.
*F16F 3/12* (2006.01)
(52) U.S. Cl. ..................................... 464/67.1; 464/68.9
(58) Field of Classification Search ............... 464/67.1, 464/68.9; 192/203
See application file for complete search history.

(56) References Cited

U.S. PATENT DOCUMENTS

| 1,334,537 A | * | 3/1920 | Hupp | .................... | 464/67.1 |
| 2002/0147051 A1 | | 10/2002 | Jackel et al. | | |

FOREIGN PATENT DOCUMENTS

| DE | 38 31 009 A1 | 3/1989 |
| DE | 40 40 605 A1 | 6/1991 |
| DE | 196 22 718 A1 | 1/1996 |
| DE | 197 00 851 A1 | 7/1997 |
| DE | 197 33 334 A1 | 2/1999 |
| DE | 100 28 268 A1 | 2/2001 |
| DE | 102 09 838 A1 | 9/2002 |
| DE | 102 41 879 A1 | 4/2003 |
| FR | 2 829 819 A 1 | 3/2003 |

OTHER PUBLICATIONS

International Search Report dated Dec. 6, 2004, including English Translation (Four (4) pages).
German Search Report dated Nov. 15, 2005, including English Translation (Five (5) pages).

* cited by examiner

*Primary Examiner*—Greg Binda
(74) *Attorney, Agent, or Firm*—Crowell & Moring LLP

(57) ABSTRACT

A torsional vibration insulator for a drive train of a vehicle, in which a primary element and a secondary element can rotate relative to one another. At least two spring elements extend in an arc in a circumferential direction of the rotational axis and are each supported on a radial outer face by a radial support device. The length of the two spring elements, viewed in the circumferential direction, can be modified by rotating the primary element with respect to the secondary element. The radial support devices of the spring elements have multiple support elements which engage with the radial outer face of the spring elements and which are rotatably mounted in the circumferential direction in such a way that the support elements can be carried along with the spring elements in the circumferential direction when the length of the spring elements is modified, thereby eliminating frictional forces inhibiting rotational motion between the primary element and the secondary element.

7 Claims, 2 Drawing Sheets

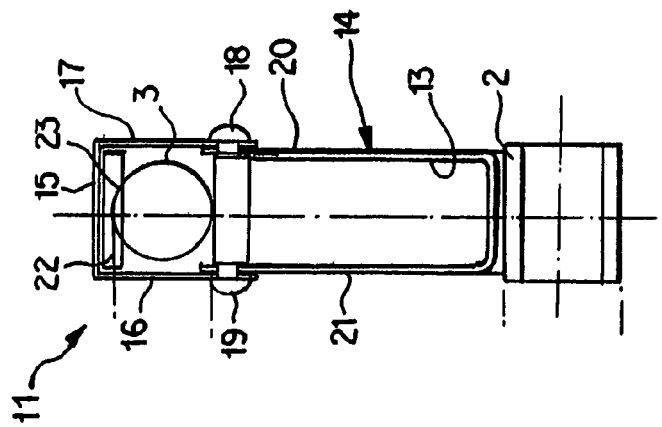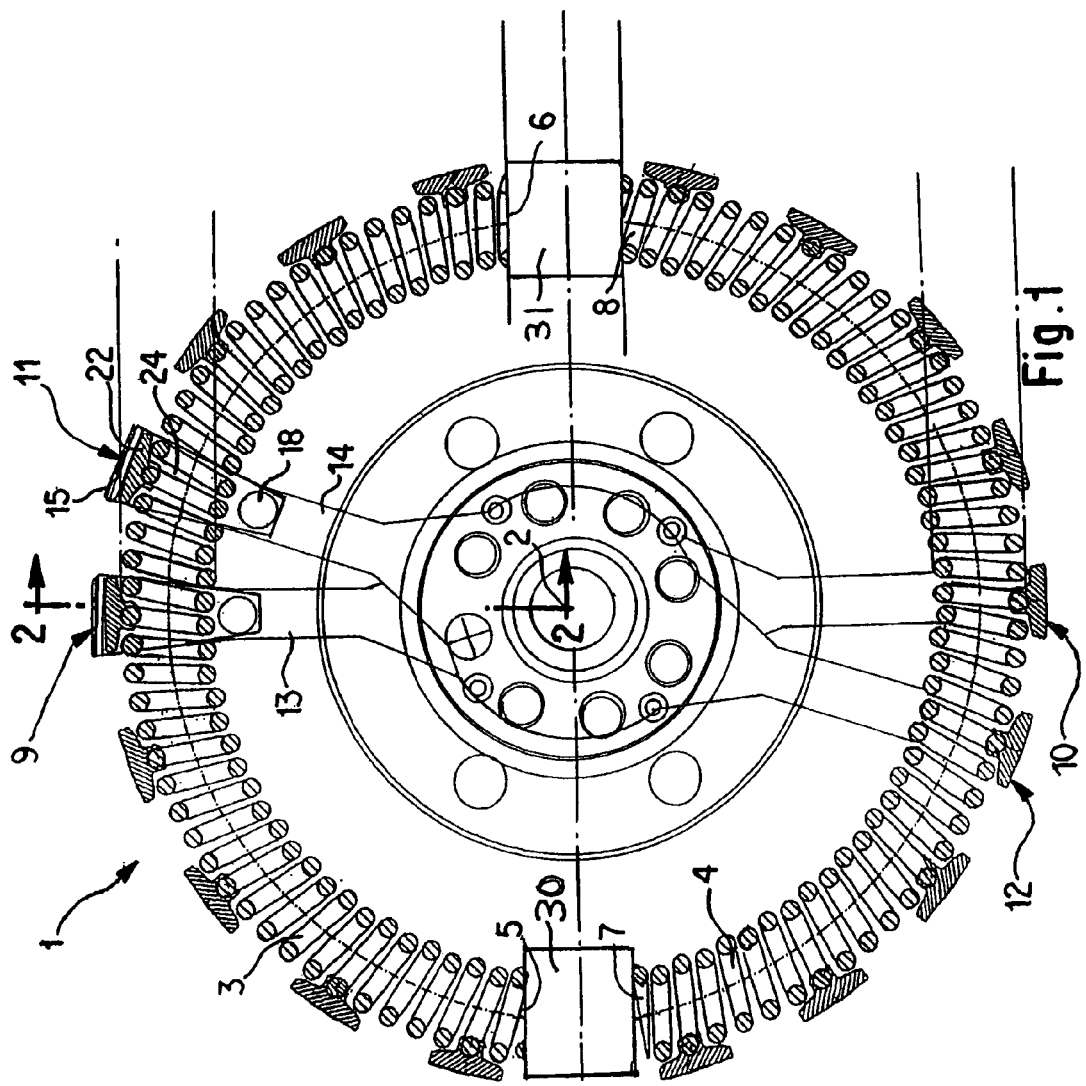

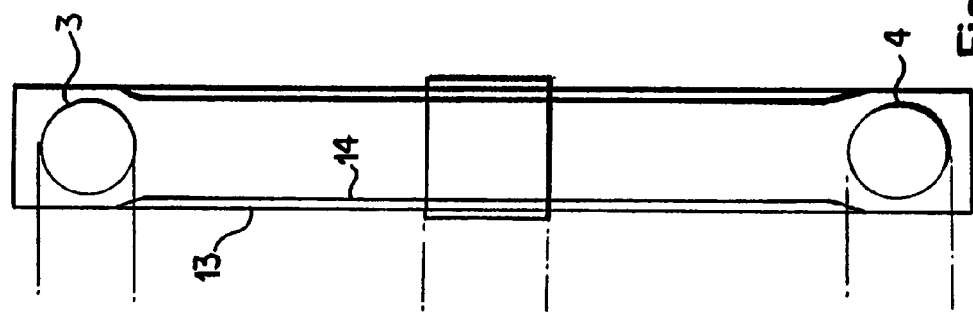
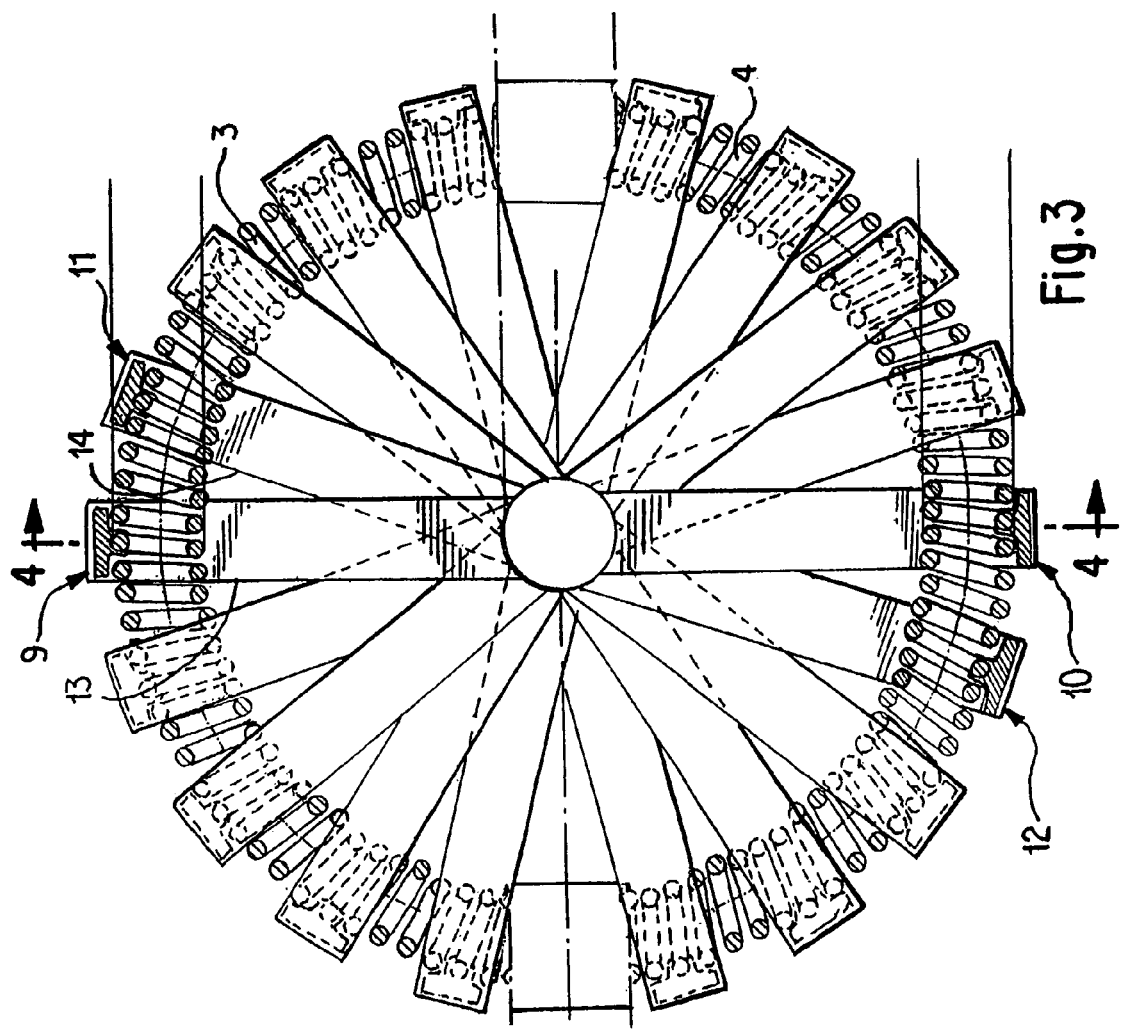

TORSIONAL VIBRATION INSULATOR

This application is a continuation application of International application PCT/EP2004/010598 filed Sep. 21, 2004 and claims the priority of German application No. 103 46 251.1, filed Oct. 6, 2003, the disclosure of which are expressly incorporated by reference herein.

BACKGROUND AND SUMMARY OF THE INVENTION

The present invention relates to a torsional vibration insulator for a vehicle drive train.

In vehicles having an internal combustion engine, torsional vibrations occur in the drive train due to the intermittent operating mode of the engine. Dual-mass flywheels, usually situated between the engine and the transmission input, have been used for quite some time to "insulate" and damp these torsional vibrations. Such a dual-mass flywheel is known from DE 197 00 851 A1 and DE 195 22 718 A1, for example.

Dual-mass flywheels, explained in a very simplified manner, comprise a primary element and a secondary element which can rotate relative to one another about a rotational axis. Multiple helical spring-like spring elements are circumferentially distributed between the primary element and the secondary element in a circumferential direction of the rotational axis. The spring elements have an arc-shaped curvature in the circumferential direction, and are therefore also referred to as "bow springs." The arc-shaped spring elements are pressed together during a relative rotation of the primary element with respect to the secondary element.

In the radial direction, each bow spring is supported from the outside by a "shell-like recess," such as a support plate, provided on the primary element or on the secondary element. This prevents the bow springs from "yielding" radially outward when pressed together. Frictional forces arise between the bow springs and the recesses or plate shells which support the bow springs in the radial direction. The frictional forces are attributed to the fact that the bow springs have an arc-shaped curvature in the circumferential direction, and the supporting forces acting on the ends of the bow springs are not aligned, but, rather, intersect one another at a certain angle, producing a resultant radial force on the bow spring. This causes a dual-mass flywheel to rotate at a high rotational speed, thereby generating centrifugal forces which act in the radial direction and press the bow springs farther outward.

Tests have shown that the torsional rigidity of a dual-mass flywheel in dynamic operation (high rotational speed) is up to 40 times greater than when in static operation (standstill or low rotational speed), which is attributed primarily to the centrifugal forces acting on the bow springs and the frictional forces thus produced. At high rotational speeds it is observed that, when torque is relieved on the dual-mass flywheel, as a result of the centrifugal force friction itself the bow springs remain "stuck" to the friction shells or recesses which support them in the radial direction, and do not correspondingly relax when the torque is relieved, but instead relax abruptly only when the rotational speed drops, temporarily causing an undesired play in the drive train. This leads to oscillation problems such as transmission rattling, thrust humming, or general overall vibrations. To avoid these problems and to reduce the wear between the bow springs and the friction shells or recesses in which the bow springs are situated, the recesses are often filled with lubricating grease, which mitigates the above-mentioned problems but does not eliminate them.

An object of the invention is to provide a torsional vibration insulator in which the above-referenced problems are avoided.

The invention proceeds from a torsional vibration insulator for a drive train of a vehicle. The torsional vibration insulator comprises a primary element and a secondary element which can rotate relative to one another about a rotational axis. The primary element forms the "torque input," and the secondary element forms the "torque output," of the torsional vibration insulator. In addition, at least two "spring elements" are provided which extend in an arc in a circumferential direction of the rotational axis. The spring elements may be formed by helical springs, which are also known as "bow springs" on account of their curvature in the circumferential direction. The spring elements or bow springs are each supported on a radial outer face by a "radial support device." In the circumferential direction a first end of each spring element is supported by the primary element, and a second end of each spring element is supported by the secondary element. The length of the spring elements, viewed in the circumferential direction, is modifiable by rotating the primary element with respect to the secondary element. "Modifiable" means that the spring elements are pressed together in a relative rotation of the primary element with respect to the secondary element.

A key concept of the invention lies in the design of the radial support devices, which prevent radial "yielding" of the spring elements when the arc-shaped spring elements are pressed together. The radial support devices according to the invention have multiple support elements that engage with the radial outer face of the spring elements. The support elements are rotatably mounted in the circumferential direction. In this context, "rotatably" means that the support elements can be carried along with the spring elements in the circumferential direction when the length of the spring elements is modified, i.e., when the primary element is rotated relative to the secondary element.

In contrast to customary configurations in which compression and relaxation of the bow springs produces a relative motion of the bow springs with respect to the friction plates or recesses which radially support the bow springs, according to the invention such a relative motion is avoided. Thus, the friction problems on the bow springs and the friction shells or recesses in which the bow springs are mounted and radially supported, which occur more frequently with conventional torsional vibration insulators, in particular at higher rotational speeds, are completely avoided. Greasing of the bow springs may be omitted in a configuration according to the invention. Thus, by use of the invention a compression and relaxation of the bow springs that is substantially free of reaction forces is achieved which corresponds to the instantaneously transmitted torque. The rotational speed of the torsional vibration insulator therefore has practically no effect on the compression and relaxation response of the bow springs.

The support elements may be U-shaped or bracket-shaped, for example, and radially enclose the spring elements (bow springs) from the outside in a bracket-like manner. The support elements may be formed by plates bent in the shape of a U.

According to one refinement of the invention, two or more of the support elements provided are connected to one another via a shared holding element situated on the rotational axis. A first of these support elements is associated with the first spring element or the first bow spring, and a second of these support elements is associated with the second spring element or the second bow spring. The two support elements are connected to one another via the holding element in such a way that the radial supporting forces acting on the support elements in the holding element cancel out one another.

Preferably, each of the support elements is connected to the associated spring element in a friction-fit manner, thus protecting it from slippage in the circumferential direction. When the spring elements are helical springs, each of the support elements may be placed from the outside on individual windings of the helical springs. To avoid slippage of the support elements, windings of the helical springs may engage with a friction fit in recesses or grooves provided in the individual support elements.

Other objects, advantages and novel features of the present invention will become apparent from the following detailed description of the invention when considered in conjunction with the accompanying drawings for example.

BRIEF DESCRIPTION OF THE DRAWINGS

FIG. 1 shows a cross-section view of a torsional vibration isolator with two holding elements in accordance with an embodiment of the present invention.

FIG. 2 shows a section through the torsional vibration isolator of FIG. 1 through Section 2-2.

FIG. 3 shows a cross-section view of a torsional vibration isolator with more than two holding elements in accordance with another embodiment of the present invention.

FIG. 4 shows a section through the torsional vibration isolator of FIG. 3 through Section 4-4.

DETAILED DESCRIPTION

FIG. 1 shows in schematic illustration a torsional vibration insulator 1 comprising a primary element and a secondary element, which are known as such and are shown here by graphical symbols 30, 31, respectively, without greater detail. The primary element and the secondary element can rotate relative to one another about a rotational axis 2. The primary element forms, for example, a torque input, and the secondary element forms a torque output, of the torsional vibration insulator 1.

A first spring element 3 and a second spring element 4 are also provided, each of which extends in the circumferential direction of the rotational axis 2. The spring elements 3, 4 are formed by helical springs in this case. The spring elements have a circular orientation, and in the exemplary embodiment shown here each extends over a circumferential section of essentially 180°. The first "bow spring" 3 has a first end 5 and a second end 6. Correspondingly, the second bow spring 4 has a first end 7 and a second end 8. The first ends 5, 7 are each supported in the circumferential direction by the primary element (not illustrated) of the torsional vibration insulator, and the second ends 6, 8 are each supported in the circumferential direction by the secondary element (not illustrated) of the torsional vibration insulator. Torque is transmitted from the primary element via the spring element 3 and the spring element 4 to the secondary element. Depending on the magnitude of the transmitted torque, the primary element and the secondary element rotate relative to one another, which causes the two spring elements to be pressed together in the circumferential direction.

Since the spring elements 3, 4 have an arc-shaped curvature, outwardly acting radial forces are produced during the compression. The spring elements 3, 4 must be supported in the radial direction to prevent radial yielding of same. To this end, support elements 9, 10 and 11, 12, respectively, are provided which are distributed in the circumferential direction. The support elements 9, 11 are associated with the first bow spring 3, and the support elements 10, 12 are associated with the second bow spring 4. The support elements 9 and 10 are connected to one another by a two-armed holding element 13 which is relatively rigid in the circumferential direction. The support elements 11, 12 are connected to one another by a corresponding holding element 14.

The holding elements 13, 14 are rotatably mounted on the rotational axis 2. The holding elements can be carried along essentially unhindered when the length of the bow springs 3, 4 is modified, i.e., when the spring elements 3, 4 are compressed or relaxed. As shown in FIG. 3, two oppositely situated support elements 9, 10 or 11, 12 are connected to one another by an associated holding element 13 or 14, respectively. The holding elements, of which only the two holding elements 13, 14 are explicitly identified by reference numerals in this case, overlap one another in a fan-like manner, which is illustrated most clearly in FIGS. 1 and 3.

As shown in FIGS. 1 and 2, each of the support elements 9–12 has a plate element 15 bent in a U-shape, having two legs 16, 17 which in the exemplary embodiment illustrated here are joined via a rivet connection 18, 19 to associated legs 20, 21 of the holding element 14. The support elements 9–12 also have a clip-like element 22 having a grooved recess 23 in its interior in which a winding 24 of the bow spring 3 engages. The support element 11 is thus protected against slippage in the circumferential direction by a friction-fit connection to the associated bow spring.

As an alternative to the exemplary embodiment shown here, in which two bow springs are provided, three or more bow springs distributed over the circumference may also be provided. In the case of three or more bow springs, the holding elements may correspondingly be provided with three or more arms, a support element being mounted on the end of each arm.

FIG. 4 shows the configuration of FIG. 3 schematically in a front view. Of the holding elements shown in FIG. 3, only the holding elements 13, 14 are explicitly illustrated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A torsional vibration insulator for a drive train of a vehicle, comprising:
   a primary element and a secondary element which can rotate relative to one another about a rotational axis;
   at least two spring elements which extend in an arc in a circumferential direction about the rotational axis; and
   radial support devices,
   wherein
   each of said spring elements is supported on a radial outer face by one of the radial support devices and in the circumferential direction on a first spring element end by the primary element and on a second spring element end by the secondary element, said radial support devices supporting said spring elements at locations displaced away from said first and second spring element ends, each of the two spring elements has a length which is changeable in the circumferential direction by rotating the primary element relative to the secondary element, the radial support devices have a plurality of support elements which engage the radial outer face of each of the spring elements and are located on the radial support devices in the circumferential direction in such a way that the support elements move with the spring elements in the circumferential direction when the respective lengths of the spring elements are changed, and each of the support elements engages its associated spring element in a friction-fit manner to protect against slippage in the circumferential direction.

2. The torsional vibration insulator according to claim 1, wherein the support elements are U-shaped and radially enclose each of the spring elements from the outside in a bracket-like manner.

3. The torsional vibration insulator according to claim 1, wherein the support elements each have a plate element bent in the shape of a U which radially encloses each of their associated spring elements from the outside.

4. The torsional vibration insulator according to claim 1, wherein at least one of the support elements associated with the first spring element and one of the support elements associated with the second spring element are connected to one another via a shared holding element, the shared holding element being situated on the rotational axis such that radial supporting forces acting on the support elements in the holding element cancel out one another.

5. The torsional vibration insulator according to claim 1, wherein the spring elements are helical springs.

6. The torsional vibration insulator according to claim 5, wherein each of the support elements engages from the outside on at least one winding of its associated helical spring, the at least one winding engaging with the support element with a friction fit.

7. The torsional vibration insulator according to claim 1, wherein more than two spring elements are each provided over an arc-shaped circumferential section and are radially supported from the outside by a plurality of support elements, and a plurality of holding elements are provided coaxially to the rotational axis, the plurality of holding elements having a plurality of radially projecting arms corresponding to the number of spring elements, each holding element having an associated arm for each of the spring elements, and a support element being provided on each free end of the arms.

* * * * *